United States Patent [19]

Kautz

[11] 4,147,002
[45] Apr. 3, 1979

[54] LIGHT VALVE SYSTEM AND GREENHOUSE UTILIZING THE SAME

[75] Inventor: Glenn E. Kautz, Sewickley, Pa.

[73] Assignee: H. H. Robertson Company, Pittsburgh, Pa.

[21] Appl. No.: 768,543

[22] Filed: Feb. 14, 1977

[51] Int. Cl.$^2$ .............................. E04C 1/42
[52] U.S. Cl. ........................ 52/306; 47/17; 52/743; 350/267
[58] Field of Search .............. 52/306, 404, 743; 47/17; 350/258, 266, 267, 312; 126/270, 271; 252/300

[56] References Cited

U.S. PATENT DOCUMENTS

| 2,489,751 | 11/1949 | Candler | 52/306 X |
| 3,013,397 | 12/1961 | Meckler | 350/258 |
| 3,016,801 | 1/1962 | Michel | 47/17 X |
| 3,341,274 | 9/1967 | Marks | 350/267 |
| 3,358,059 | 12/1967 | Snyder | 52/743 X |
| 3,708,219 | 1/1973 | Forlini | 350/267 X |
| 3,742,600 | 7/1973 | Lowell | 350/267 X |
| 3,756,700 | 9/1973 | Saxe | 350/267 |
| 4,020,989 | 5/1977 | Kautz | 47/17 |

Primary Examiner—J. Karl Bell
Attorney, Agent, or Firm—Harry B. Keck; George E. Manias

[57] ABSTRACT

A light valve system wherein particulate material is introduced into a normally light-transmitting cavity to restrict light transmission through the cavity from one side to the other. The cavity may be partially or totally filled with a particulate material depending on the degree of light restriction desired. The particulate material may comprise a thermal insulating material which restricts heat transmission as well as light transmission through the cavity. The use of the present light valve system in a greenhouse structure is described.

18 Claims, 16 Drawing Figures

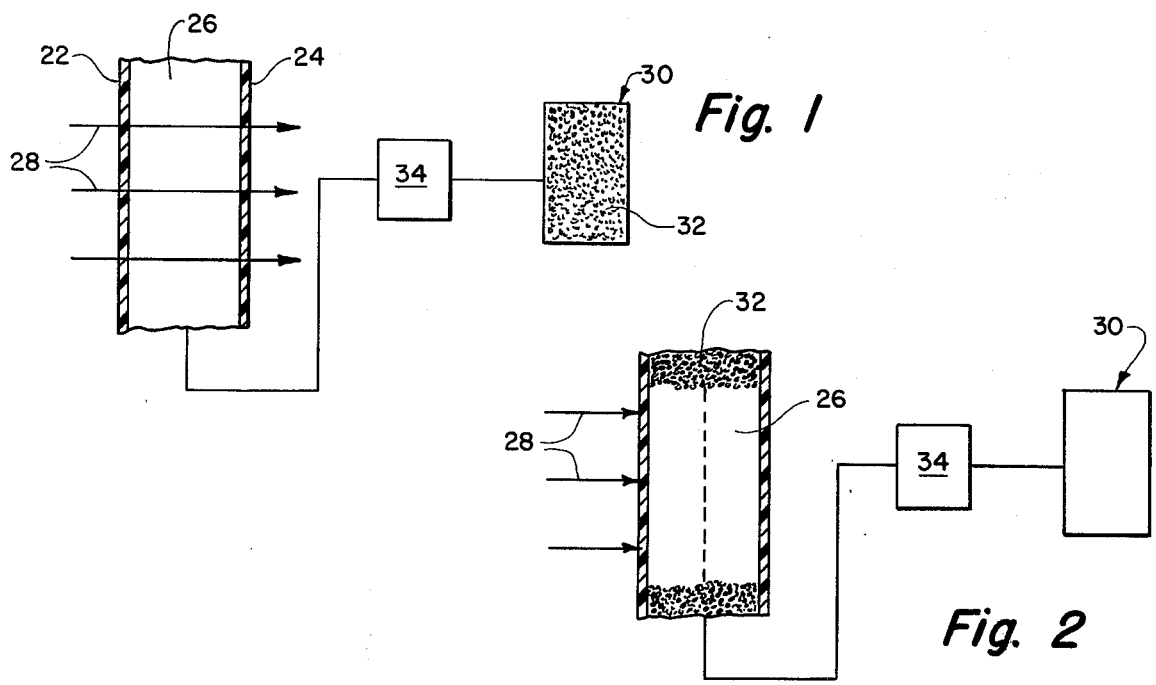
Fig. 1
Fig. 2
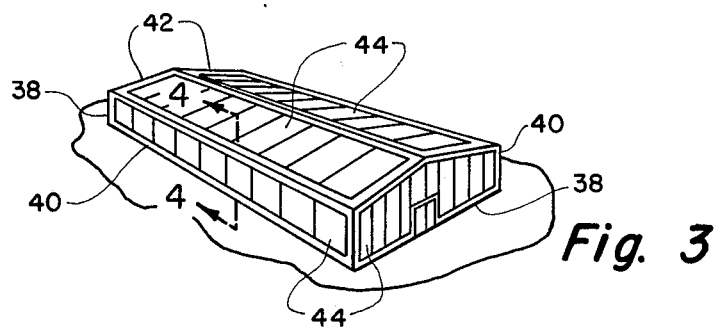
Fig. 3
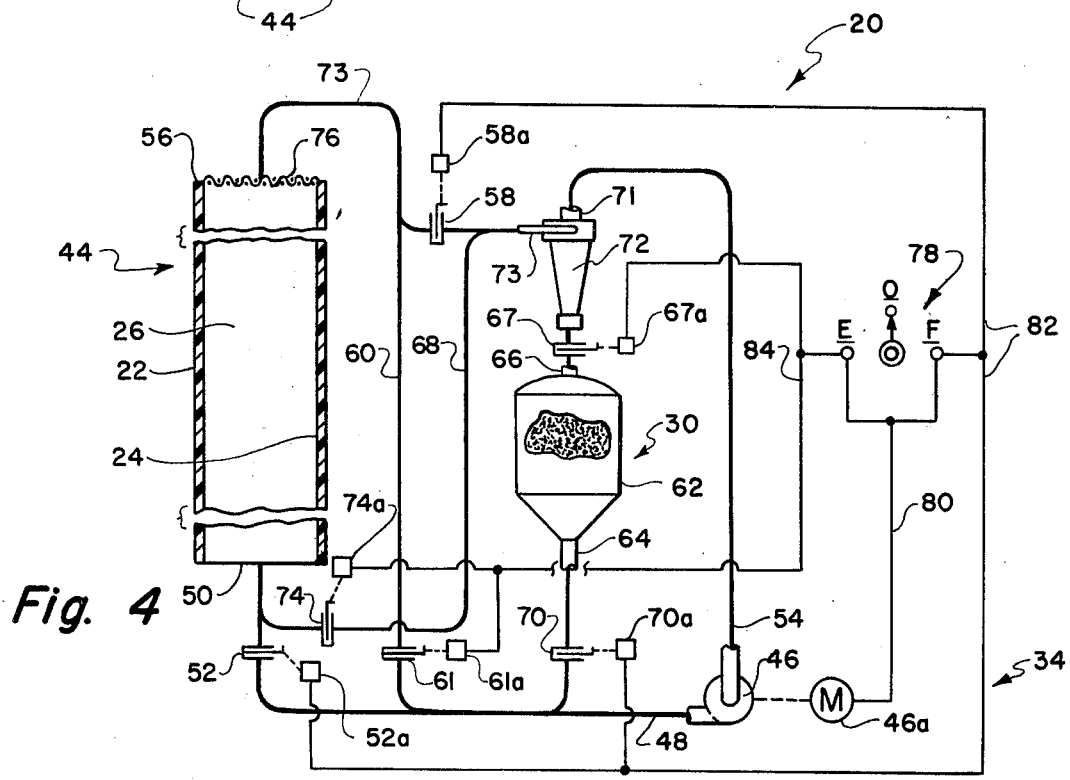
Fig. 4

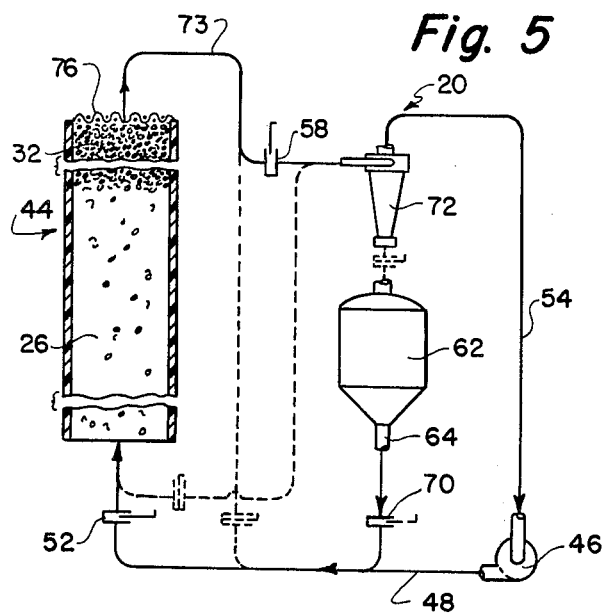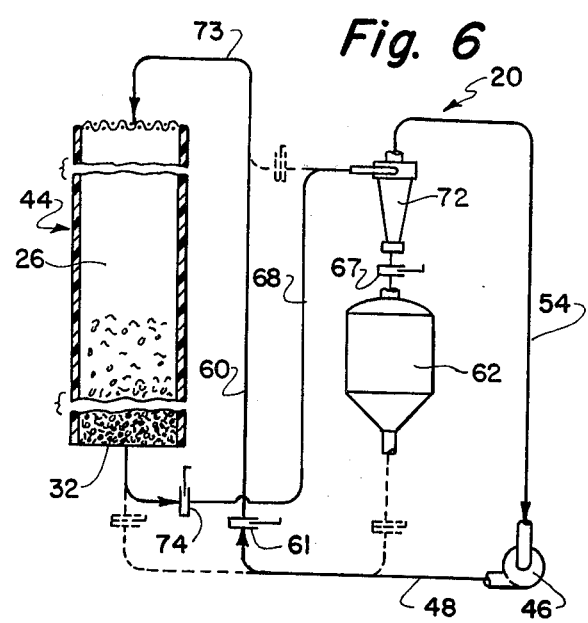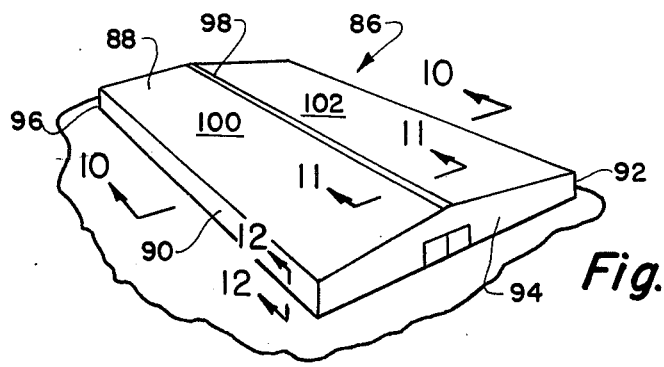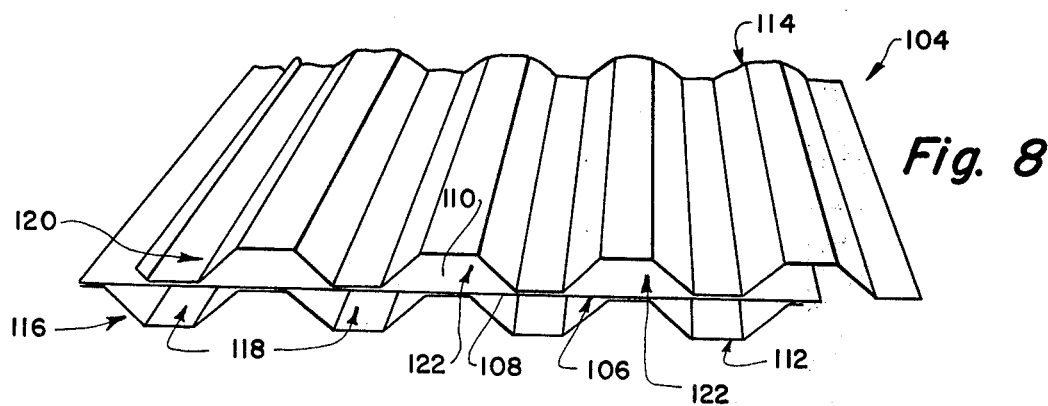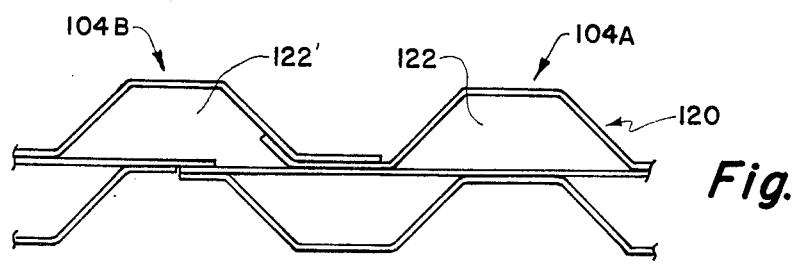

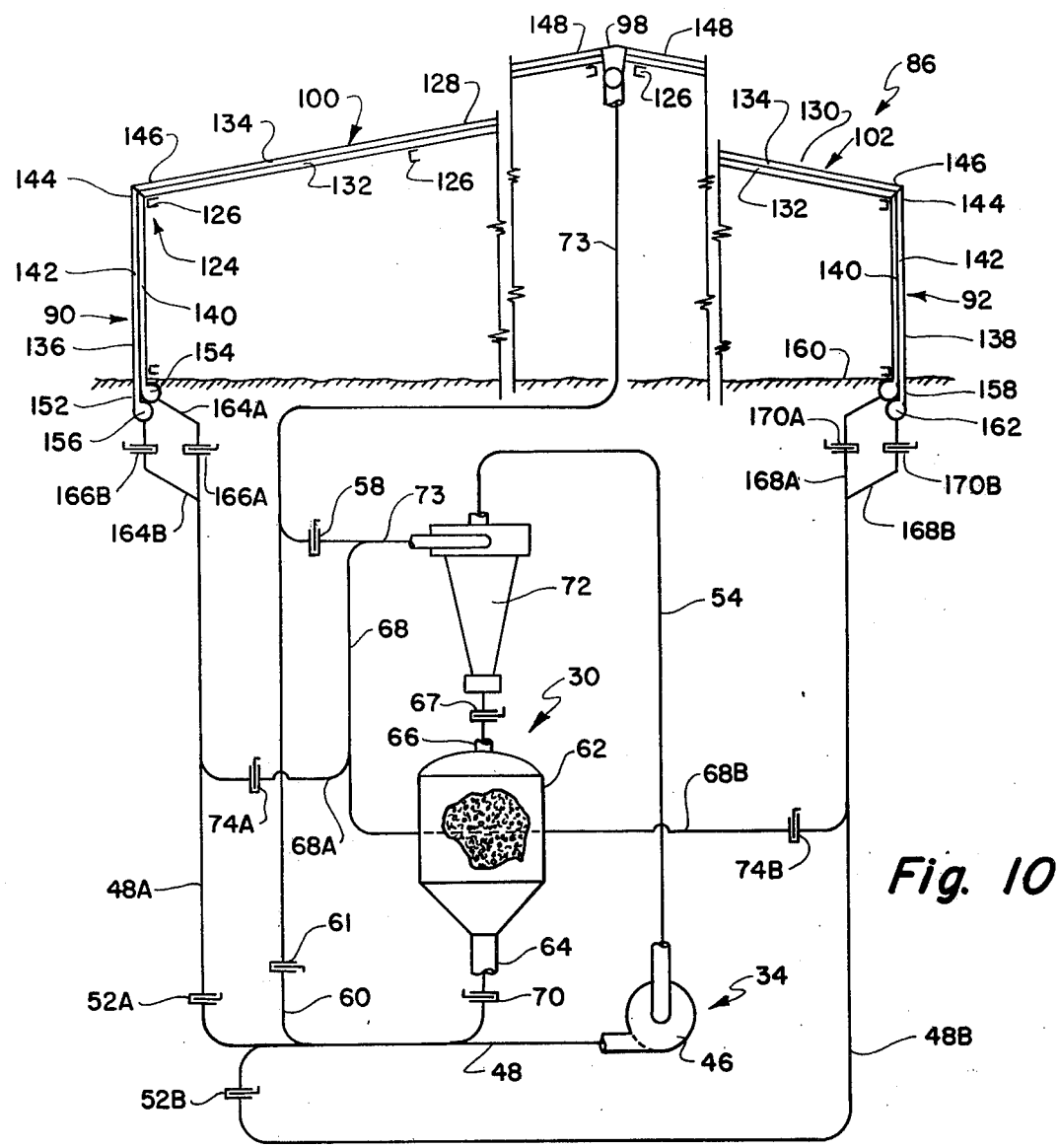
Fig. 10
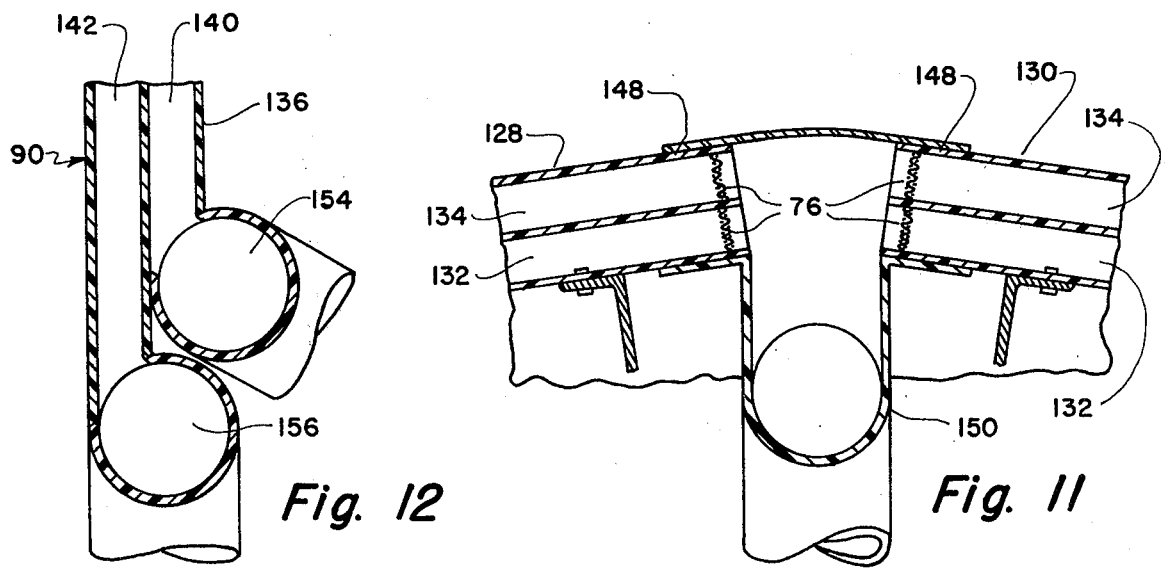
Fig. 12
Fig. 11

LIGHT VALVE SYSTEM AND GREENHOUSE UTILIZING THE SAME

BACKGROUND OF THE INVENTION

1. Field of the Invention

This invention concerns a light valve system and, more particularly, a light valve system utilizing particulate material as a medium for restricting light transmission through the valve.

2. Description of the Prior Art

Greenhouses provide weather protection for tender plants. Cultivation of the plants requires the atmosphere within the greenhouse to be maintained at a selected temperature and humidity level. Factors affecting the greenhouse atmosphere include heat gains and heat losses. For example, during long periods of sun exposure, abnormal amounts of solar energy enter the greenhouse which tends to raise the temperature. Heretofore the exterior surfaces of the greenhouse have been painted, for example with whitewash, to restrict transmission of solar energy into the greenhouse; and sometime thereafter the whitewash has been removed to restore the original light transmission character of the greenhouse walls and roof.

Where excessive outward heat radiation is encountered, such as during cool clear nights or during winter, abnormal heat losses occur which tend to lower the temperature within the greenhouse. Such losses have heretofore been reduced by covering the greenhouse with a tarpaulin or other suitable insulating covering.

SUMMARY OF THE INVENTION

The principal object of this invention is to provide a novel light valve system wherein particulate material serves as a light-restricting medium.

Another object of this invention is to provide a novel light valve system wherein particulate material comprising a thermal insulating material serves to restrict heat transmission as well as light transmission through the valve.

Still another object of this invention is to provide a light valve system for use in buildings having need for restricting light transmission either from the interior to the exterior or from the exterior to the interior.

Still another object of this invention is to provide a light valve system for use in a greenhouse wherein shading and/or heat insulation is required.

In accordance with the present invention, a light valve system is provided comprising spaced-apart sheets of light-transmitting material arranged to define a cavity. Conveying means is provided which communicates with the cavity for introducing particulate material from a source into the cavity to restrict light transmission through the cavity from one side to the other, and for returning the particulate material from the cavity to the source to restore light transmission through the cavity. The particulate material may be opaque or translucent. The particulate material also may comprise a thermal insulating material of the type which restricts heat transmission as well as light transmission through the cavity.

BRIEF DESCRIPTION OF THE DRAWINGS

FIGS. 1 and 2 are cross-sectional views schematically illustrating the principle of the present light valve system;

FIG. 3 is a perspective view of a building having zones adapted to transmit light;

FIG. 4 is a cross-sectional view, taken along the line 4—4 of FIG. 3, schematically illustrating the light valve system as used in the building of FIG. 3;

FIGS. 5 and 6 are views, similar to FIG. 4, schematically illustrating the operation of the light valve system;

FIG. 7 is a perspective view of a greenhouse incorporating the light valve system;

FIG. 8 is a fragmentary perspective view of a light-transmitting panel utilized in the greenhouse of FIG. 7;

FIG. 9 is a fragmentary end view of a pair of the building panels of FIG. 8 assembled in edge-overlapped relation;

FIG. 10 is a cross-sectional view taken along the line 10—10 of FIG. 7;

FIG. 11 is a cross-sectional view taken along the line 11—11 of FIG. 7;

FIG. 12 is a cross-sectional view taken along the line 12—12 of FIG. 7; and

DESCRIPTION OF THE PREFERRED EMBODIMENT(S)

Figure 13:
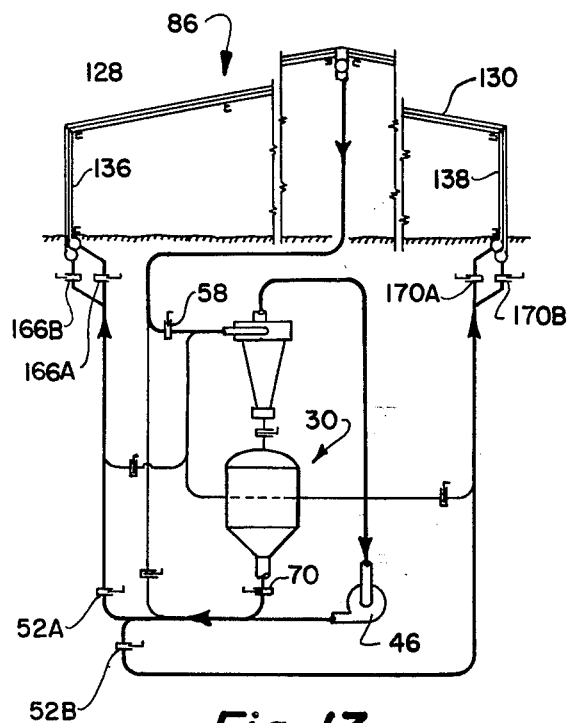
FIGS. 13 through 16 are views, similar to FIG. 10, schematically illustrating the operation of the light valve system as used in the greenhouse of FIG. 7.

Referring to FIG. 1, the light valve system of this invention includes a light valve 20 comprising spaced-apart sheets 22, 24 arranged to define a cavity 26 therebetween. The sheets 22, 24 are formed from a light-transmitting material whereby light, schematically illustrated by the arrows 28, is transmitted through the cavity 26 from one side to the other. The sheets 22, 24 may be formed from suitable transparent or translucent materials, such as plastics and glass.

The present light valve system also incorporates a source 30 of particulate material 32. The particulate material 32 may be opaque or translucent depending on the degree of light restriction desired. Where thermal insulation as well as light transmission restriction is desired, the particulate material 32 may comprise such insulating materials as beads of polystyrene, polyethylene.

The present light valve system also incorporates conveying means schematically illustrated at 34 which communicates with the cavity 26 and with the source 30 for introducing the particulate material 32 from the source 30 into the cavity 26 (FIG. 2) thereby to restrict light transmission through the cavity from one side to the other; and for returning the particulate material 32 from the cavity 26 to the source 30 (FIG. 1) to restore light transmission through the cavity 26.

FIG. 3 illustrates a building 36 having end wall, sidewall, and roof structures 38, 40, 42, respectively. At least one of the structures 38, 40, 42 includes zones 44 adapted to pass light from one side to the other.

FIG. 4 illustrates the use of the present light valve system 20 to restrict light transmission through one or more of the zones 44 of the building 36 of FIG. 3. The conveying means 34 preferably utilizes a conveying fluid, such as compressed air, as provided by a blower 46. The blower 46 includes an outlet conduit 48 which communicates with a lower end 50 of the cavity 26. The outlet conduit 48 incorporates a control valve, such as slide valve means 52. The blower 46 also includes an inlet conduit 54 which communicates with a gas outlet 71 of a cyclone separator 72. The inlet conduit 73 communicates with an upper end 56 of the cavity 26, and incorporates a control valve, such as slide valve means 58. A bypass conduit 60 is provided having one end communicating with the outlet conduit 48 at a location between the blower 46 and the slide valve means 52; and an opposite end communicating with the inlet conduit 73 at a location between the slide valve means 58 and the upper end 56 of the cavity 26. The bypass conduit 60 is provided with a control valve, such as slide valve means 61.

The source 30 of particulate material 32 may comprise a vessel 62 having a lower discharge conduit 64 and an inlet conduit 66. The lower discharge conduit 64 communicates with the outlet conduit 48 at a location upstream of the bypass conduit 60. A control valve, such as slide valve means 70, controls the discharge of particulate material 32 from the vessel 62 into the outlet conduit 48, as will be described. The inlet conduit 66 communicates with the solids outlet of the cyclone separator 72 and incorporates slide valve means 67.

A second inlet conduit 68 communicates, at one end, with the blower outlet conduit 48 at a location between the lower end 50 of the cavity 26 and the slide valve means 52; and at the other end with the inlet conduit 73. The cyclone separator 72 separates the particulate material 32 from the conveying fluid and returns the material 32 to the vessel 62. The inlet conduit 68 is provided with a control valve, such as slide valve means 74.

It will be observed in FIG. 4 that the cavity 26 is provided with retaining means 76 which obstructs passage of the particulate material 32 during introduction thereof into the cavity 26 but which allows passage of the conveying fluid. The retaining means 76 may comprise a fine mesh screen which extends transversely across the upper end 56 of the cavity 26.

The slide valve means 52, 58, 61, 67, 70, and 74 may be operated manually or by electric or pneumatic motors. In FIG. 4, the slide valve means 52, 58, 61, 67, 70, and 74 are shown operated by electric motors 52a, 58a, 61a, 67a, 70a, and 74a, respectively. Operation of the slide valve means may be controlled by switch means 78 having three positions, including an "off" position O, a "fill" position F, and an "empty" position E. Motor means 46a drives the blower 46 and is electrically connected by conductor 80 to the "fill" and "empty" positions F and E. The motors 52a, 70a, and 58a are electrically connected by conductor 82 to the "fill" position F. The motors 61a, 67a, and 74a are electrically connected by conductor 84 to the "empty" position E.

Operation of the light valve system 20 of FIG. 4 will be described with reference to FIGS. 5 and 6.

When it is desired to restrict light transmission through one or more of the zones 44, the switch means 78 (FIG. 4) is turned to the "fill" position F whereupon the slide valve means 52, 58, and 70 (FIG. 5) are opened and the blower 46 is energized. Particulate material 32 flows downwardly through the lower discharge conduit 64 through the slide valve means 70 into the outlet conduit 48. The pressurized conveying fluid provided by the blower 46 conveys the particulate material 32 through the now open slide valve means 52 into the cavity 26. It will be observed that while the particulate material 32 is retained within the cavity 26 by the retaining means 76, the conveying fluid passes through the retaining means 76 and is returned by way of the inlet conduit 73 through the cyclone separator 72 and inlet conduit 54 to the blower 46. When the cavity 26 is entirely filled with particulate material 32, the switch means 78 (FIG. 4) is returned to the "off" position O, the blower 46 is deenergized. The slide valve means 52 is closed, thereby maintaining the particulate material 32 within the cavity 26.

When it is desired to restore light transmission through the zones 44, the switch means 78 (FIG. 4 is thrown to the empty position E whereupon slide valve means 61, 67 and 74 (FIG. 6) are opened and the blower 46 is energized. Pressurized conveying fluid flows through the blower outlet conduit 48, the blower bypass conduit 60, and the inlet conduit 73 into the cavity 26. The conveying fluid conveys the particulate material 32 through the inlet conduit 68 into the cyclone separator 72. The particulate material 32 is separated from the conveying fluid by centrifugal forces and drops downwardly into the vessel 62. The conveying fluid flows from the cyclone separatur 72 through the blower inlet conduit 54 to the blower 46. When the cavity 26 is emptied, the switch means 78 (FIG. 4) is returned to the "off" position O whereupon the blower 46 is de-energized and the slide valve means 61, 67 and 74 are closed.

Greenhouses provide weather protection for tender plants. Air conditioning equipment associated with a greenhouse provides an atmosphere of controlled temperature and humidity for the proper cultivation of the plants. Where excessive sun exposure is encountered, abnormal heat loads must be dissipated by the air conditioning equipment to maintain the required atmosphere. Where excessive outward heat radiation occurs, such as during clear nights, make-up heat must be provided by the air conditioning equipment to maintain the required atmosphere. It should be evident that controlling the atmosphere within a greenhouse requires the expenditure of costly energy.

The amount of energy expended in controlling a greenhouse atmosphere may be reduced by the present light valve system. For example, the present light valve system provides shading as well as thermal insulation during periods of excessive sun exposure thereby minimizing the heat energy entering the greenhouse. The preset light valve system may provide thermal insulation during periods where excessive outward readiation would occur, thereby minimizing heat loss from the interior of the greenhouse.

The light valve system of this invention is particularly useful in greenhouses having roof and perimeter wall structures assembled from light-transmitting panels. Such a light-transmitting panel and greenhouse are disclosed in copending application Ser. No. 624,275 filed Oct. 2, 1975, and now U.S. Pat. No. 4,020,989 and copending divisional application Ser. No. 723,148 filed Sept. 14, 1976, both assigned to the assignee of this invention.

FIG. 7 illustrates a greenhouse 86 having a roof structure 88 and perimeter walls including opposite sidewalls 90, 92, and opposite end walls 94, 96. The roof structure 88, in this illustration, is a double-pitched roof including a ridge 98 and sloped roof sections 100, 102. The perimeter walls 90, 92, 94, and 96 and the roof sections 100, 102 each may be assembled from a plurality of light-transmitting panels 104 such as illustrated in FIG. 8. In general, the light-transmitting building panel 104 comprises a flat central sheet 106 having a first or lower face 108 and opposite thereto a second or upper face 110; and lower and upper corrugated sheets 112, 114 confronting, respectively, the first and second faces 108, 110 of the flat central sheet 106. The corrugated sheets 112, 114 are secured to the flat central sheet 106 along contiguous portions thereof and cooperate therewith to provide, respectively, a set 116 of lower cells or cavities 118 and a set 120 of upper cells or cavities 122. The upper corrugated sheet 114 is laterally offset relative to the lower corrugated sheet 112 and to the flat central sheet 106 such that each upper cell 122 is presented intermediate of adjacent ones of the lower cells 118. The arrangement inhibits heat conduction between the internal and external surfaces of the panel. The configuration of the panel 104 is such that adjacent panels 104A, 104B (FIG. 9) may be assembled in side-by-side edge-overlapped relation. The arrangment is such that an upper cell 122' is formed between the adjacent panels 104A, 104B, thereby providing continuity in the set 120 of upper cells 122. For a more complete description of the light-transmitting building panel 104, reference is directed to the aforesaid U.S. Pat. No. 4,020,989 and to copending application Ser. No. 723,148.

As schematically illustrated in FIG. 10, the roof structure 86 and the perimeter walls 90, 92, 94, and 96 are supported on a structural framework 124 of which only horizontal frame members 126 are shown. The roof sections 100, 102 each comprise a plurality of roof panels 128, 130 assembled in the side-by-side overlapped relation illustrated in FIG. 9. The roof panels 100, 102 include a first set of roof cells 132 presented interiorly of the greenhouse 86 and a second set of roof cells 134 presented exteriorly of the greenhouse 86. the sidewalls 90, 92 each comprise a plurality of wall panels 136, 138 assembled in the side-by-side overlapped relation illustrated in FIG. 9. The wall panels 136, 138 include a first set of wall cells 140 presented interiorly of the greenhouse 86, and a second set of wall cells 142 presented exteriorly of the greenhouse 86.

The upper ends 144 of the wall panels 136 and the proximal ends 146 of the roof panels 128 are mitered and are secured together in cell-aligned relation such that the roof cells 132, 134 communicate, respectively, with the wall cells 140, 142. Similarly, the upper ends 144 of the wall panels 138 and the proximal ends 146 of the roof panels 130 are mitered and are secured together in cell-aligned relation such that the roof cells 132, 134 communicate, respectively, with the wall cells 140, 142. The roof panels 128, 130 have distal ends 148 (FIG. 11) which communicate with common manifold means 150. Each of the roof panels 128 and 130 are provided with the retaining means 76. The retaining means 76 may comprise a fine mesh screen extending transversely across the roof cells 132, 134 of each of the roof panels 128, 130.

Referring to FIGS. 10 and 12, the first and second sets of wall cells 140, 142 of the wall panels 136 each communicate with separate common manifold means 154, 156 respectively. In the opposite sidewall 92, the first and second sets of wall cells 140, 142 each communicate with separate manifold means 160, 162.

FIG. 10 also illustrates the source 30 of particulate material 32 and the conveying means 34, both of which are similar to those illustrated in FIG. 4. The conduit arrangment associated with the source 30 and the blower 34 differs from that shown in FIG. 4 in several respects. For example, the blower outlet conduit 48 separates into outlet branch conduits 48A, 48B downstream of the bypass conduit 60. The branch conduit 48A separates into secondary branch conduits 164A, 164B which communicate with the separate manifold means 154, 156, respectively. The secondary branch conduits 164A, 164B are provided with control valves such as slide valve means 166A, 166B. The branch conduit 48B separates into secondary branch conduits 168A, 168B which communicate, respectively, with the separate manifold means 160, 162. Control valves such as slide valve means 170A, 170B are provided in the secondary branch conduits 168A, 168B. The second inlet conduit 68 of the separator 72 separates, at a location upstream of the separator 72, into branch inlet conduits 68A, 68B. The branch inlet conduit 68A communicates with the branch conduit 48A whereas the branch inlet conduit 68B communicates with the branch conduit 48B. The arrangement if such that all of the cells 132, 134 of the roof panels 128, 130 and all of the cells 140, 142 of the wall panels 136, 138 may be entirely filled to restrict light transmission from the exterior of the greenhouse 86 to the interior thereof. The arrangement also is such that only the interior cells 132, 140 may be filled or only the exterior cells 134, 142 may be filled. Still further, the arrangement provide for filling the inner cells, the outer cells, or all of the cells on one side of the greenhouse, for example, the roof panels 128 and the wall panels 136. Accordingly, the amount of shading desired may be provided when required.

The operation of the present light valve system in the greenhouse 86 is schematically illustrated in FIGS. 13 through 16.

FIG. 13 illustrates the manner in which all of the cells throughout the greenhouse are filled. The slide valve means 70, 52A, 52B, 166A, 166B, 170A, 170B, and 58 are opened and the blower 46 is energized. The particulate material 32 is transferred from the source 30 to the cells of the wall panels 136, 138 and of the roof panels 128, 130. When all of the cells are filled, the open valve means are closed and the blower 46 is de-energized.

Figure 14:
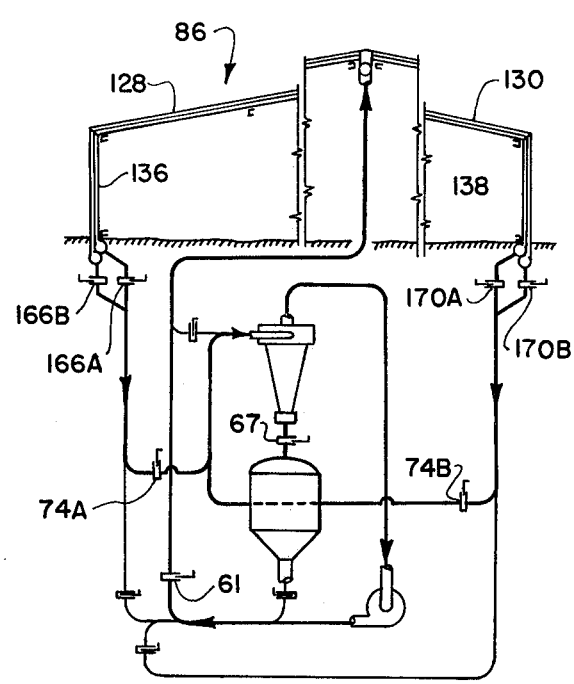

FIG. 14 illustrates the manner in which the cells are emptied, that is, by which the granular material 32 is transferred from the cells of the roof and wall panels 128, 130, 136, 138 to the source 30. Only the valve means 61, 67 74A, 74B, 166A, 166B, 170A, and 170B are open during the emptying operation.

Figure 15:
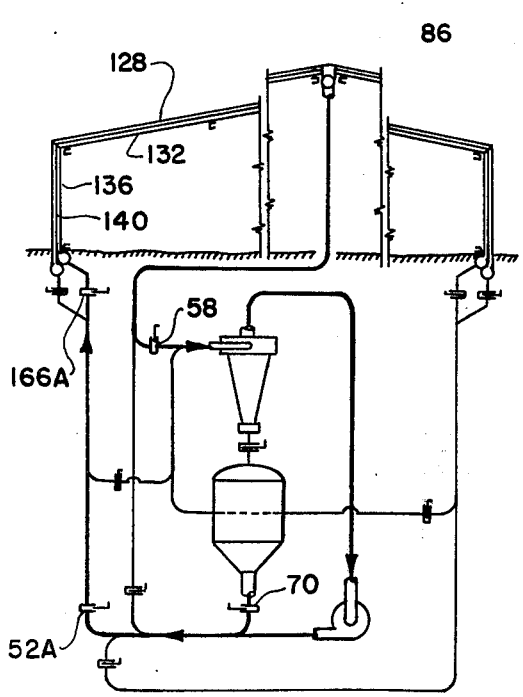

FIG. 15 illustrates the manner in which only the inner cells 132, 140 on one side of the greenhouse 86 are filled, thereby to provide partial shading for the greenhouse. Only the valve means 70, 52A, 166A, and 58 are open during this partial filling operation.

Figure 16:
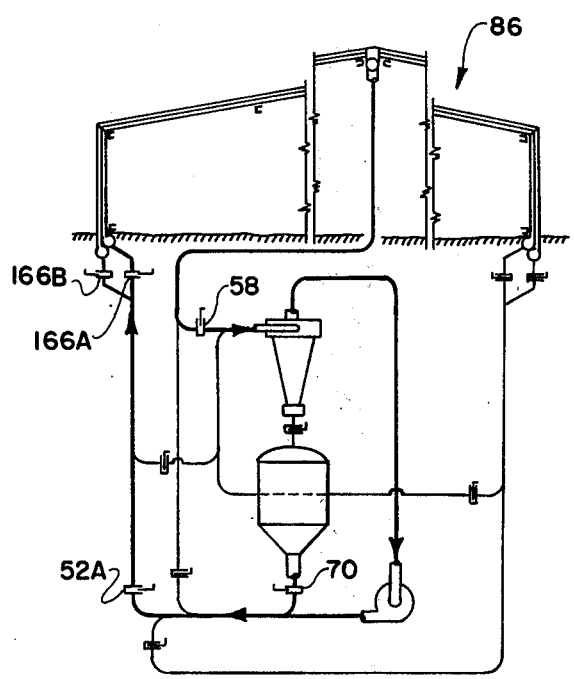

FIG. 16 illustrates the manner in which the inner cells 132, 140 and the outer cells 134, 142 in one half of the greenhouse 86 are filled, thereby to provide total shading for the selected half of the greenhouse 86. Only the valve means 70, 52A, 166A, 166B, and 58 are open during the filling operation.

I claim:
1. A light valve comprising:
spaced-apart sheets of light-transmitting material arranged to define a cavity;
a source of dry particulate material;
conveying means communicating with said cavity (a) for introducing dry particulate material from said source into said cavity to restrict light transmission through said cavity from one side to the other, and (b) for returning dry particulate material from said cavity to said source to restore light transmission through said cavity; and
means for obstructing discharge of dry particulate material from said cavity during introduction thereof.

2. The light valve of claim 1 wherein said particulate material is opaque.

3. The light valve of claim 1 wherein said particulate material is translucent.

4. The light valve of claim 1 wherein said particulate material comprises a thermal insulating material which restricts heat transmission as well as light transmission through said cavity.

5. In a greenhouse having a structural framework, opposite sidewalls and opposite end walls erected on said framework and a roof structure spanning between said opposite sidewalls and supported on said framework; the combination including:
    said roof structure comprising a plurality of edge overlapped roof panels spanning between said opposite sidewalls and having a first set of cells presented interiorly of said greenhouse and a second set of cells presented exteriorly of said greenhouse;
    each of said sidewalls comprising a plurality of edge overlapped wall panels erected vertically and each having a first set of cells and a second set of cells which communicate at their upper ends, respectively, with the proximal ends of the cells of said first set of cells and of said second set of cells of said roof panels;
    said roof panels and said wall panels being formed from light transmitting material;
    a source of dry particulate material;
    conveying means (a) for introducing dry particulate material from said source into at least one said set of cells to restrict light transmission through said one set of cells from the exterior to the interior of said greenhouse and (b) for returning dry particulate material from said one said set of cells to said source to restore light transmission through said one said set of cells; and
    retaining means for obstructing discharge of dry particulate material from said cavity during introduction thereof.

6. The greenhouse of claim 5 wherein said particulate material is opaque.

7. The greenhouse of claim 5 wherein said particulate material is translucent.

8. The greenhouse of claim 5 wherein said particulate material comprises a thermal insulating material thereby to restrict heat transmission as well as light transmission through said one said set of cells.

9. The greenhouse of claim 5 wherein
    said conveying means utilizes a conveying fluid; and
    said retaining means is positioned within the cells of said first set and of said second set and allows passage of said conveying fluid.

10. The greenhouse of claim 9 wherein said conveying means communicates with the lower ends of the cells of said wall panels and with the distal ends of the cells of said roof panels.

11. The greenhouse of claim 9 wherein
    said retaining means comprises a fine mesh screen extending transversely across the distal ends of the cells of said roof panels.

12. In a building having end wall, sidewall and roof structures, the combination comprising:
    at least one of said structures including a zone adapted to pass light from one side to the other, said zone including a cavity defined by spaced-apart sheets of light-transmitting material;
    a source of dry particulate material;
    conveying means communicating with said cavity (a) for introducing dry particulate material from said source into said cavity to restrict light transmission through said cavity from one side to the other; and (b) for returning dry particulate material from said cavity to said source to restore light transmission through said cavity; and
    retaining means for obstructing discharge of dry particulate material from said cavity during introduction thereof.

13. The building of claim 12 wherein said particulate material is opaque.

14. The building of claim 12 wherein said particulate material is translucent.

15. The building of claim 12 wherein said particulate material comprises a thermal insulating material which restricts heat transmission as well as light transmission through said cavity.

16. The building of claim 12 wherein
    said conveying means utilizes a conveying fluid, and communicates with a lower end and a distal end of said cavity; and
    said retaining means resides at one said end of said cavity and allows passage of said conveying fluid.

17. The building of claim 16 wherein
    the particulate material is introduced through said lower end; and wherein
    said retaining means is positioned at said distal end.

18. The building of claim 12 wherein
    said retaining means comprises a fine mesh screen.

* * * * *